(12) United States Patent
Velasco et al.

(10) Patent No.: US 9,423,154 B1
(45) Date of Patent: Aug. 23, 2016

(54) SOLAR HEAT COLLECTING ELEMENT HAVING AN EDGE WELDED BELLOWS ASSEMBLY

(75) Inventors: David Velasco, Mount Laurel, NJ (US); John Ditri, Huntingdon Valley, PA (US); Nancy E. Wasson, Mount Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1314 days.

(21) Appl. No.: 12/701,183

(22) Filed: Feb. 5, 2010

(51) Int. Cl.
*F24J 2/50* (2006.01)
*F24J 2/05* (2006.01)
*F24J 2/24* (2006.01)
*F24J 2/46* (2006.01)

(52) U.S. Cl.
CPC *F24J 2/05* (2013.01); *F24J 2/055* (2013.01); *F24J 2/24* (2013.01); *F24J 2002/4681* (2013.01)

(58) Field of Classification Search
CPC ...... F24J 2002/4681; F24J 2/05; F24J 2/055; F24J 2/24
USPC ........ 126/652, 677; 285/299, 300, 301, 302, 285/303, 226
See application file for complete search history.

(56) References Cited

U.S. PATENT DOCUMENTS

| | | | |
|---|---|---|---|
| 1,294,466 A | 2/1919 | Houskeeper | |
| 1,560,690 A | 11/1925 | Houskeeper | |
| 1,786,506 A * | 12/1930 | Ray | 285/300 |
| 2,172,612 A * | 9/1939 | Hassenkamm | 285/300 |
| 2,427,456 A * | 9/1947 | Hoy | 285/267 |
| 2,687,146 A | 8/1954 | Ferguson | |
| 4,133,298 A | 1/1979 | Hayama | |
| 4,186,725 A | 2/1980 | Schwartz | |
| 4,231,353 A | 11/1980 | Kanatani et al. | |
| 4,505,263 A * | 3/1985 | Nameda et al. | 126/605 |
| 4,523,578 A | 6/1985 | Mahdjuri Sabet | |
| 4,554,908 A * | 11/1985 | Hanlet et al. | 126/652 |
| 4,565,263 A | 1/1986 | Southworth | |
| 4,674,477 A | 6/1987 | Tabor | |
| 4,703,749 A | 11/1987 | Morse | |
| 4,803,972 A | 2/1989 | Janson | |
| 4,924,756 A * | 5/1990 | Berube et al. | 92/45 |
| 5,177,977 A | 1/1993 | Larsen | |
| 6,155,250 A | 12/2000 | Mieda et al. | |
| 6,324,870 B1 | 12/2001 | Chabin et al. | |
| 6,631,928 B1 * | 10/2003 | Sakata | 285/226 |
| 6,705,311 B1 | 3/2004 | Schwartzman et al. | |
| 7,013,887 B2 * | 3/2006 | Kuckelkorn et al. | 126/652 |
| 7,562,655 B2 | 7/2009 | Kuckelkorn et al. | |
| 8,097,318 B2 | 1/2012 | Mientkewitz et al. | |
| 8,881,721 B2 | 11/2014 | Morber et al. | |
| 2008/0216823 A1 | 9/2008 | Kmetovicz et al. | |

(Continued)

OTHER PUBLICATIONS

Non-Final Office Action for U.S. Appl. No. 13/272,927, mailed Sep. 24, 2015, 13 pages.

(Continued)

*Primary Examiner* — Avinash Savani
*Assistant Examiner* — Aaron Heyamoto
(74) *Attorney, Agent, or Firm* — Withrow & Terranova, PLLC

(57) ABSTRACT

A solar heat collecting element for use in solar troughs and solar power systems. The solar heat collecting element includes a conduit for carrying a heat transfer fluid; a light transparent envelope disposed about the conduit; and an edge welded metal bellows assembly coupling a first end of the conduit with a first end of the envelope.

19 Claims, 6 Drawing Sheets

(56) References Cited

U.S. PATENT DOCUMENTS

| | | |
|---|---|---|
| 2009/0090109 A1 | 4/2009 | Mills et al. |
| 2011/0233013 A1 | 9/2011 | Siebke |
| 2012/0272950 A1 | 11/2012 | Martinez Sanz et al. |

OTHER PUBLICATIONS

Burkholder, F. et al., "Heat Loss Testing of Schott's 2008 PTR70 Parabolic Trough Receiver," Technical Report NREL/TP-550-45633, May 2009, National Renewable Energy Laboratory, 58 pages.

Forristall, R., "Heat Transfer Analysis and Modeling of a Parabolic Trough Solar Receiver Implemented in Engineering Equation Solver," Technical Report NREL/TP-550-34169, Oct. 2003, National Renewable Energy Laboratory, 164 pages.

Lei, Dongqiang et al., "The study of One-Through Solar Absorber Receiver," International Conference on Sustainable Power Generation and Supply, Apr. 6-7, 2009, IEEE, 4 pages.

Melchior, Tom et al., "A cavity-receiver containing a tubular absorber for high-temperature thermochemical processing using concentrated solar energy," International Journal of Thermal Sciences, vol. 47, Issue 11, Nov. 2008, Elsevier Masson SAS, pp. 1496-1503.

Non-Final Office Action for U.S. Appl. No. 13/173,331, mailed Nov. 7, 2013, 7 pages.

Final Office Action for U.S. Appl. No. 13/173,331, mailed Apr. 8, 2014, 7 pages.

Notice of Allowance for U.S. Appl. No. 13/173,331, mailed Jul. 17, 2014, 7 pages.

Corrected Notice of Allowability for U.S. Appl. No. 13/173,331, mailed Oct. 6, 2014, 4 pages.

Non-Final Office Action for U.S. Appl. No. 13/272,927, mailed Mar. 13, 2014, 15 pages.

Final Office Action for U.S. Appl. No. 13/272,927, mailed Nov. 6, 2014, 18 pages.

Non-Final Office Action and Applicant-Initiated Interview Summary for U.S. Appl. No. 13/272,927, mailed Jun. 16, 2016, 18 pages.

\* cited by examiner

SOLAR HEAT COLLECTING ELEMENT HAVING AN EDGE WELDED BELLOWS ASSEMBLY

FIELD

This present disclosure relates to solar heat collecting devices. More particularly, the present disclosure relates to a solar heat collecting element that uses an edge welded metal bellows assembly.

BACKGROUND

Parabolic solar troughs for generating electricity from sunlight energy, include heat collector elements. Typical heat collector elements include a pipe-like solar absorber disposed within a glass envelope, for carrying a heat transfer fluid. Because the solar absorber and the glass envelope have different coefficients of linear thermal expansion, the solar absorber and the glass envelope expand and contract longitudinally at significantly different rates. To compensate for the different linear thermal expansion and contractions, formed bellows assemblies are used for coupling the glass envelope to the solar absorber. One end of the bellows assembly is usually attached to the solar absorber by a welded joint and the other end of the bellows assembly is usually attached to the glass envelope by a glass-to-metal seal.

The solar heat collector elements heat cycle daily with temperatures approaching 400 degrees centigrade. These daily temperature fluctuations contribute to potential stresses in the glass envelope, particularly at the glass-to-metal seal. Due to the temperature range and the significantly different rates of thermal expansion between the solar absorber and the glass envelope, a significant increase in longitudinal expansion is experienced by the solar absorber with respect to the glass envelope.

The main objective of the solar absorber is to collect as much available solar radiation as possible. The solar absorber in current heat collector elements that employ formed bellows assembly at each end, have approximately 3 percent of their surface area shielded by the bellows assembly. The shielding of the solar absorber reduces the optical efficiency of the solar heat collector element.

Accordingly, a solar heat collector element with greater optical efficiency is desired.

SUMMARY

A solar heat collecting element is disclosed herein. The solar heat collecting element includes a conduit for carrying a heat transfer fluid; a light transparent envelope disposed about the conduit; and an edge welded metal bellows assembly coupling a first end of the conduit with a first end of the envelope.

Also disclosed herein is a solar trough. The solar trough includes a solar heat collecting element and a light concentrator for directing solar radiation onto the solar heat collecting element. The solar heat collecting element includes a conduit for carrying a heat transfer fluid; a light transparent envelope disposed about the conduit; and an edge welded metal bellows assembly coupling a first end of the conduit with a first end of the envelope.

Also disclosed herein is solar power system. The solar power system includes a plurality of solar troughs each having a solar heat collecting element and a light concentrator for directing solar radiation onto the solar collecting element. The solar heat collecting element of at least one of the solar troughs includes a conduit for carrying a heat transfer fluid; a light transparent envelope disposed about the conduit; and an edge welded metal bellows assembly coupling a first end of the conduit with a first end of the envelope.

DETAILED DESCRIPTION

Figure 1:
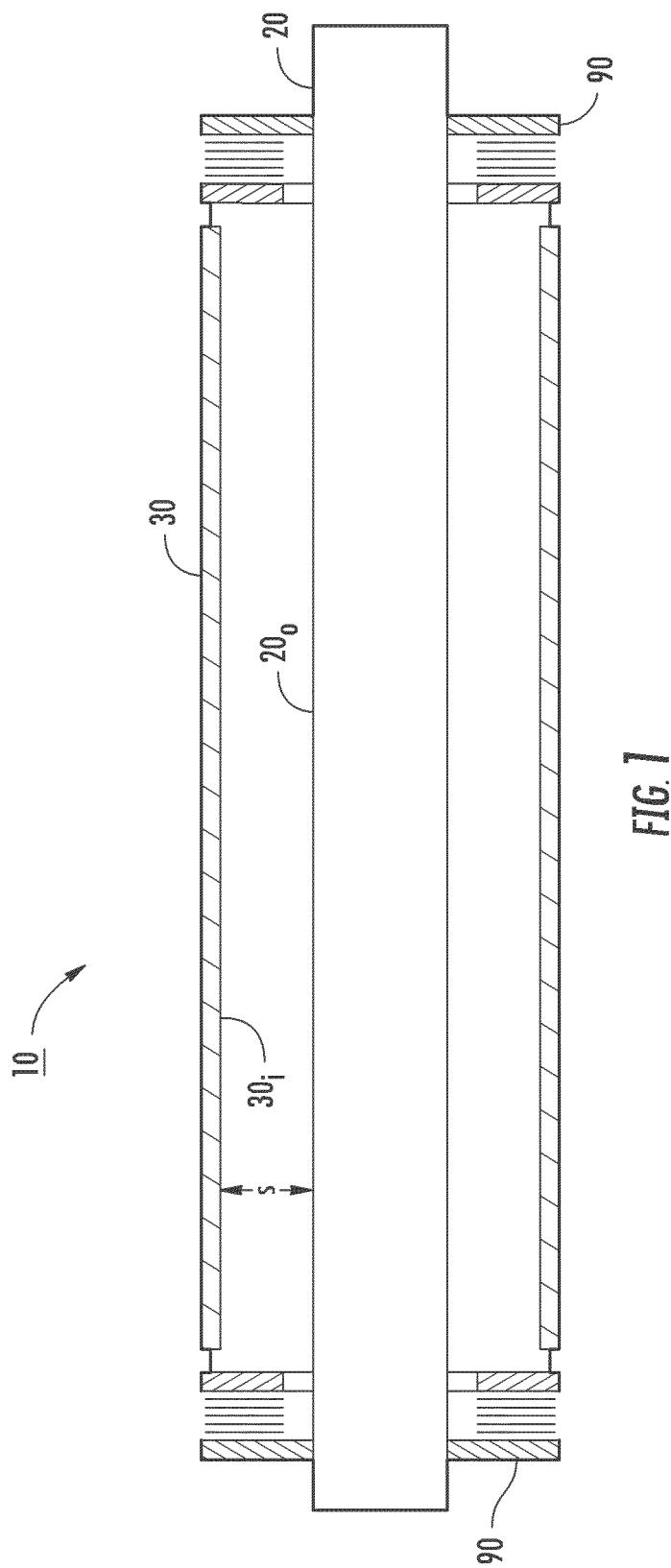
FIG. 1 is an elevational view of an embodiment of a solar heat collecting element with portions thereof shown in cross-section.

FIG. 1 shows an embodiment of a solar heat collecting element (SHCE) 10 according to the present disclosure. The SHCE 10 generally comprises a glass envelope 30 and a solar absorber 20 disposed within the glass envelope 30, for carrying a heat transfer fluid. In one embodiment, the SHCE 10 has a length of about 4 meters, although other embodiments of the SHCE 10 may be less than or greater than 4 meters in length. The solar absorber 20 of the SHCE 10 absorbs the solar radiation and converts it into heat, which is transmitted to the heat transfer fluid flowing therethrough.

Figure 5:
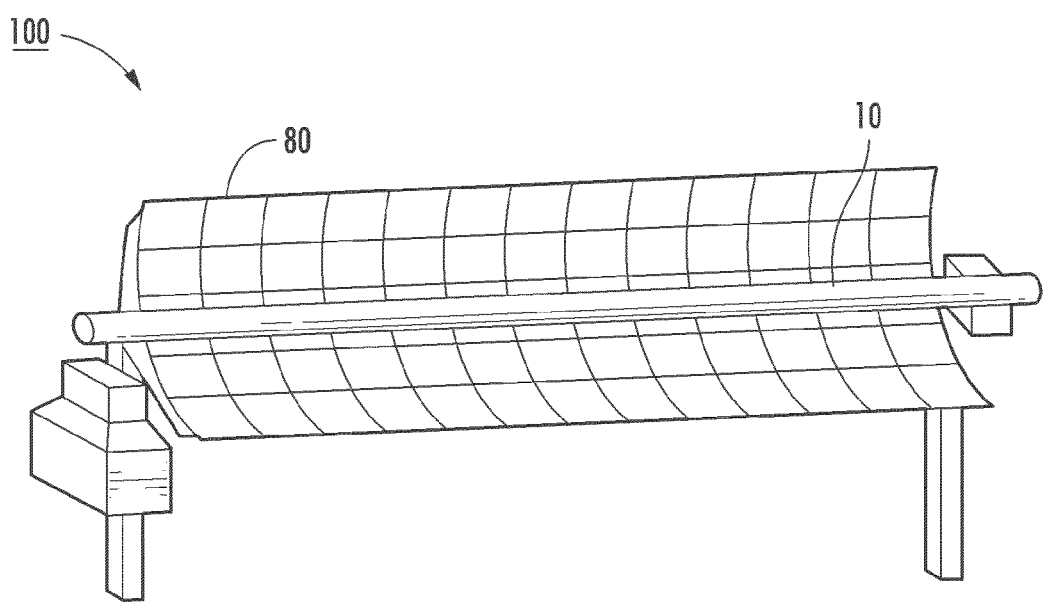
FIG. 5 is a perspective view of an embodiment of a parabolic solar trough according to the present disclosure.
Figure 6:
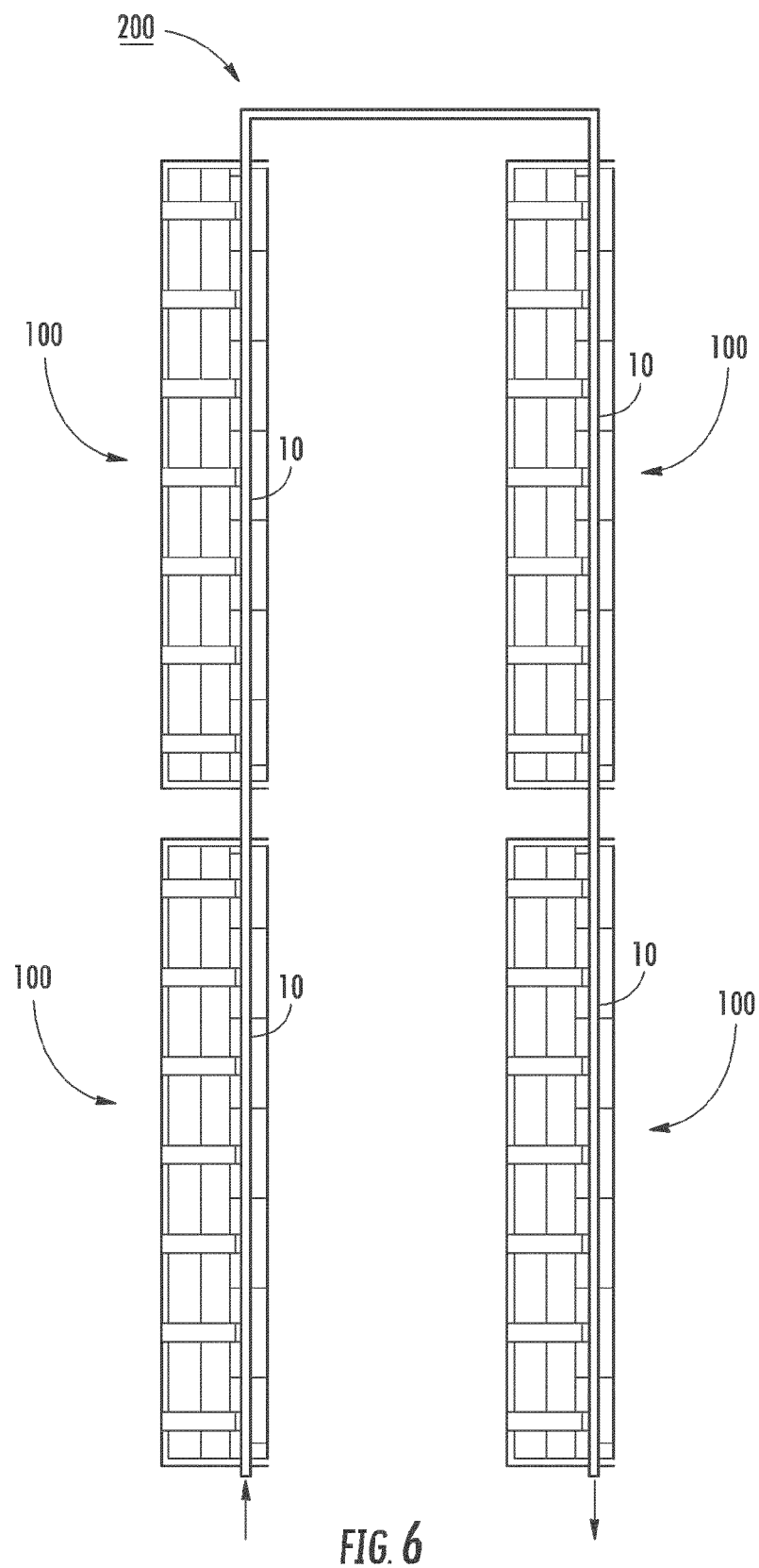
FIG. 6 is a plan view of an embodiment of a solar power system according to the present disclosure.

The SHCE 10 may be used in a parabolic solar trough 100 as shown in FIG. 5. A plurality of serially coupled parabolic solar troughs are commonly used in a solar field or system 200 to convert sunlight to energy (FIG. 6). The parabolic solar trough 100 includes a light concentrator 80, e.g., a parabolic mirror, which focuses or concentrates sunlight on the SHCE 10. The SHCE 10 may also be used in any other solar thermal energy collector to convert focused sunlight to energy.

Referring again to FIG. 1, the solar absorber 20 of the SHCE 10 is formed by an elongated hollow pipe which extends the length of the SHCE 10. The pipe forming the solar absorber 20 may be any suitable shape or combination of shapes and made of a suitable material including but not limited to metals, alloys, polymers, and composites. The solar absorber 20 may have a fixed, stepped or varying diameter and/or width, and have a fixed, stepped or varying wall thickness. In one embodiment, the solar absorber 20 may be made of steel, carbon steel, or stainless steel, and constructed in a cylindrical shape.

The glass envelope 30 may extend continuously about the entire outer surface 20*o* of the solar absorber 20 so that the solar absorber 20 is coaxially disposed within the glass envelope 30. The glass envelope 30 should be made from a glass that is highly transparent to solar light which has a wavelength of about 390 to 780 nanometers, to allow for maximum sunlight to impinge on the solar absorber 20. As shown in FIG. 1, the glass envelope 30 is constructed so that the inner surface 30*i* of the glass envelope 30 is separated from the outer surface 20*o* of the solar absorber 20 by a space S. In one exemplary embodiment, the space S between the inner surface 30*i* of the glass envelope 30 and outer surface 20*o* of the solar absorber 20 may be evacuated to form a substantial vacuum therein. In other embodiments, the space S between the inner surface 30*i* of the glass envelope 30 and outer surface 20*o* of the solar absorber 20 may be filled with air or some other fluid, i.e., gas or liquid. The vacuum or fluid contained in the space S operates as a heat insulator to prevent heat loss from the solar absorber 20.

In parabolic solar trough applications, the solar absorber 20 of the SHCE 10 typically has an outer diameter of about 70 mm. In such an embodiment, the insulation vacuum contained in the space S may be optimized by using a glass envelope 30 having an outer diameter between about 115 mm and about 120 mm to provide a space S having a width between about 19 mm and 25 mm. The optimization of the insulation space S counters sag of the solar absorber 20 as it heats up. In other embodiments and/or applications, the outer diameter of the glass envelope 30 and the width of the space S may be other dimensions. In still other embodiments and/or applications where the solar absorber 20 has an outer diameter other than 70 mm, the outer diameter of the glass envelope 30 and the width of the space S may be other dimensions.

The solar absorber 20 and the glass envelope 30 have different coefficients of linear thermal expansion because they are constructed from different materials. The different linear thermal expansion coefficients cause the solar absorber 20 and the glass envelope 30 to expand and contract longitudinally (length-wise) at different rates. To compensate for the different linear thermal expansion and contractions, a collapsible or compressible edge welded metal (EWM) bellows assembly 90 is disposed at each end of the SHCE 10. The EWM bellows assembly 90 at each end of the SHCE 10 coaxially aligns the ends of the solar absorber 20 and the glass envelope 30. The EWM bellows assembly 90 allow the solar absorber 20 and glass envelope 30 to grow and shrink in length relative to one another when they are heated by the sun during the day and then cooled after the sun goes down at night.

Figure 2:
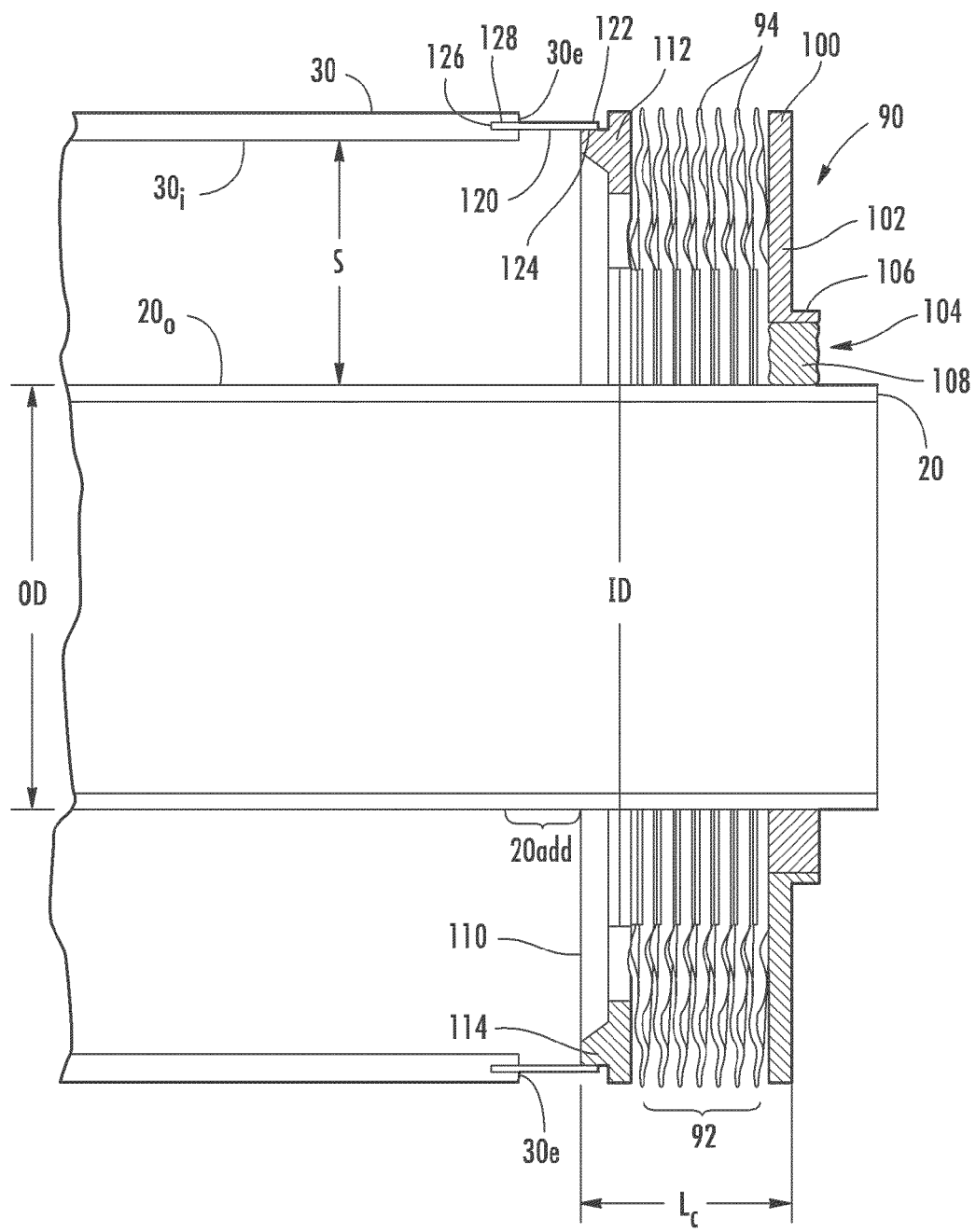
FIG. 2 is a cross-sectional view of one end of the solar heat collecting element of FIG. 1.

As shown in FIG. 2, the EWM bellows assembly 90 includes a flexible, hollow cylindrical intermediate structure 92 formed by a plurality of convolutions 94 disposed between first and second end members 100 and 110, respectively. The number of convolutions 94 depends upon the operating temperature of the SHCE 10 and the linear thermal expansion coefficients of the solar absorber 20 and the glass envelope 30. In one exemplary embodiment where the operating temperature will be between about 6 degrees centigrade and about 391 degrees centigrade, the solar absorber 20 is made of stainless steel, and the glass envelope has a highly light transmissive borosilicate glass composition, the EWM bellows assembly 90 includes between 6 and 8 convolutions.

The first end member 100 of the EWM bellows may be formed as a circular plate or closure structure 102 having a central opening 104 that allows the solar absorber 20 to pass through the end member 100. An outwardly extending circular flange or collar 106 surrounds the central opening 104. The first end member 100 may be made of stainless steel or any other suitable metallic material. The flange or collar 106 of the first end member 100 is permanently joined to the outer surface 20*o* of the solar absorber 20 by a hermetic seal 108. The hermetic seal 108 may be formed using any suitable hermetic sealing method including without limitation welding, brazing, soldering or adhesive bonding.

The second end member 110 comprises an annular or ring structure 112 having an exterior flange or lip 114 extending toward an edge 30*e* of the glass envelope 30. The second end member 110 may be made of stainless steel or any other suitable metallic material. A cylindrical extension member 120, made of Kovar or any other suitable metallic material, is permanently joined at a first end 122 with the flange or lip 114 of the second end member 110 by a hermetic seal 124. The hermetic seal 124 may be formed using any suitable hermetic sealing method including without limitation welding, brazing, soldering or adhesive bonding. A second end 126 of the extension member 120 is permanently joined with the edge 30*e* of the glass envelope 30 by a hermetic glass-to-metal seal 128. The hermetic glass-to-metal seal 128 may be formed using any suitable glass-to-metal seal forming method.

Figure 3:
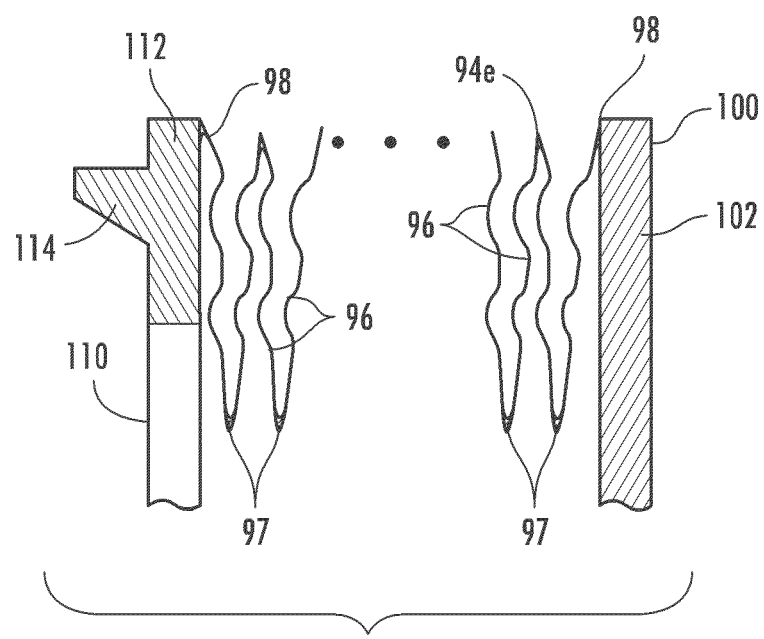
FIG. 3 is an enlarged cross-sectional view of an edge welded bellows assembly.

Referring to FIG. 3, each of the convolutions 94 of the intermediate (convolution) structure 92 of the EWM bellows assembly 90 is formed by a pair of contoured, ring-like plates 96 that are permanently attached at their inside diameters with a hermetic seal 97, which may be formed by welding, brazing, soldering or adhesive bonding. The pair of contoured, ring-like plates 96 form a single- or multiple-rippled nested configuration. More specifically, the bellows assembly 90 contains convolutions 92 shaped in such a manner so as to allow adjacent convolutions 92 to nest against one another with minimal to no clearance in between, when the bellows assembly 90 is in a compressed state.

As shown in FIG. 2, the convolution structure 92 has an inner diameter ID that is sized to allow the solar absorber 20 to radially expand under high operating temperatures without contacting the convolutions 94. For example, in one exemplary embodiment where the solar absorber 20 has an outer diameter OD of about 70 mm, the convolution structure 92 may have an inner diameter ID of about 85 mm. The ring-like plates 96 may be made of stainless steel or any other suitable metallic material. The convolution structure is formed by stacking a desired number of the convolutions 94 and permanently attaching them at their outside diameters with hermetic seals 98, which may be formed by welding, brazing, soldering or adhesive bonding. The convolution structure 92 may be fixedly connected to the end members 100 and 110 by respectively hermetic seals 101 and 111.

Figure 4:
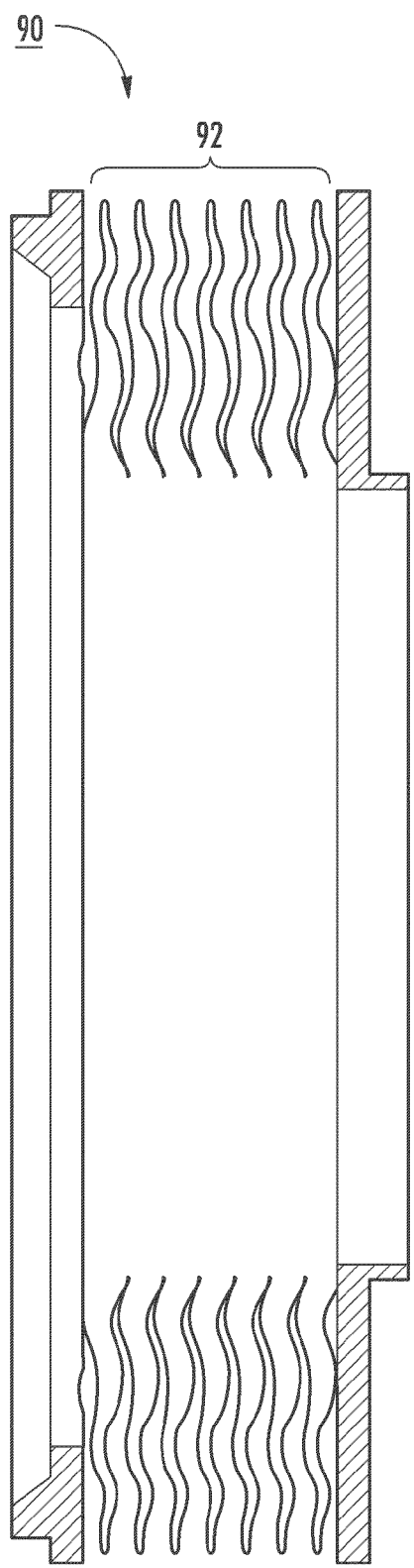
FIG. 4 is a cross-sectional view of the edge welded bellows assembly in an uncompressed and unexpanded state.

Referring to FIG. 4, the nested configuration of the convolution structure 92 provides the EWM bellows assembly 90 with an unexpanded, free-length FL that is substantially less than the unexpanded free-length of formed bellows used in prior art of SHCEs. For example, in one embodiment of a prior art SHCE, each of the formed bellows assemblies typically has an unexpanded free length of about 74 mm, at room temperature (about 68-72 degrees F.). In comparison, the EWM bellows assembly 90 of the present SHCE 10 has an unexpanded free-length FL of about 50 mm, at room temperature, which is about a 32 percent shorter than the unexpanded free-length of the prior art bellows assembly, at room temperature. Because the EWM bellows assembly 90 has a shorter unexpanded free-length, it covers less surface area of the solar absorber 20, which in turn, allows more surface area of the solar absorber 20 to be exposed to solar radiation.

Additionally, the convolutions 94 of the nested convolution structure 92 can be squeezed together until they slightly and temporarily deformed to allow the EWM bellows assembly 90 to be preloaded or compressed to about 80 percent of its unexpanded free-length $L_C$ or about 40 mm, at room temperature, as shown in FIG. 2. Such compression of the EWM bellows assembly 90 can be made without permanently deforming the convolutions 94. In contrast, prior art formed bellows cannot be compressed to a length that is significantly shorter than their unexpanded free-length. Accordingly, when the EWM bellows assembly 90 of the present SHCE 10 is preloaded or compressed to length $L_C$, it is about 46 percent shorter than the unexpanded free-length of the prior art bellows, at room temperature. The preloaded or compressed EWM bellows assembly 90 maintains its structural integrity and further increases the amount of surface area of the solar absorber 20 that is exposed to solar radiation, thereby leading to further increases in the optical efficiency of the solar absorber 20. The additional surface area of the solar absorber 20, which can be exposed to solar radiation by using the EWM bellows assembly 90, is identified in FIG. 2 by reference character $20_{add}$.

In a typical prior art SHCE having a solar absorber of 4.06 meters in length and a formed bellows at each end of the absorber, the available portion of the solar absorber's 4.06 meter length for exposure to solar radiation is about 3.912 meters. For comparison, the use of a preloaded or compressed EWM bellows assembly 90 ($L_C$ equal to about 40 mm) in the SHCE 10 of the present disclosure, allow about 3.98 meters of the solar absorber's 4.06 meter length to be exposed to solar radiation or approximately an additional 0.068 meters (68 mm). The increased exposure to light operates as a major factor in increasing the optical efficiency of the SHCE 10, resulting in more thermal energy (e.g., BTU/hour or watts,) available for conversion to electricity or other renewable energy applications.

In one embodiment, the SHCE 10 is manufactured by permanently joining the flange or lip 114 of the second end member 110 of the EWM bellows assembly 90 with the first end 122 of the metallic cylindrical extension member 120 via the hermetic seal 124. The second end 126 of the extension member 120 is permanently joined with the edge 30e of the glass envelope 30 via the hermetic glass-to-metal seal 128. The EWM bellows assembly 90 is preloaded or compressed to a desired compressed length $L_C$ and then the flange or collar 106 of first end member 100 of the EWM bellows assembly 90 is permanently joined with the outer surface 20o of the solar absorber 20 using the hermetic seal 108.

Although the SHCE, solar trough, and solar power system have been described in terms of exemplary embodiments, they are not limited thereto. Rather, the appended claims should be construed broadly, to include other variants and embodiments of same, which may be made by those skilled in the art without departing from the scope and range of equivalents of same.

What is claimed is:

1. A solar heat collecting element comprising:
a conduit for carrying a heat transfer fluid, the conduit having first and second ends;
a light transparent envelope disposed about the conduit, the light transparent envelope having first and second ends; and
an edge welded metal bellows assembly comprising:
a first annular end member comprising:
a first annular surface that engages a concave internal surface of an annular extension that extends from the light transparent envelope; and
a second annular surface that extends substantially perpendicularly from the first annular surface and limits insertion of the first annular end member into the annular extension; and
a plurality of convolutions disposed entirely outside the light transparent envelope, the plurality of convolutions shaped to allow adjacent convolutions to nest against one another without permanent deformation.

2. The solar heat collecting element of claim 1, wherein the edge welded metal bellows assembly is in a compressed state when the solar heat collecting element is at room temperature, the edge welded metal bellows assembly expanding and contracting to accommodate the changing lengths of the conduit and the light transparent envelope as the solar heat collector thermally cycles.

3. The solar heat collecting element of claim 1, wherein the conduit is made of stainless steel or carbon steel.

4. The solar heat collecting element of claim 1, wherein the light transparent envelope is made of glass.

5. The solar heat collecting element of claim 1, wherein the edge welded metal bellows assembly is made of stainless steel.

6. The solar heat collecting element of claim 1, wherein the annular extension comprises metal and extends from the light transparent envelope.

7. The solar heat collecting element of claim 1, wherein the edge welded metal bellows assembly includes a second annular end member fixedly attached to the conduit.

8. The solar heat collecting element of claim 1, further comprising another edge welded metal bellows assembly coupling the second end of the conduit with the second end of the light transparent envelope.

9. The solar heat collecting element of claim 1, wherein the plurality of convolutions are shaped in such a manner so as to allow adjacent ones of the convolutions to nest against one another when the edge welded metal bellows assembly is in a compressed state, the edge welded metal bellows assembly expanding and contracting to accommodate changing lengths of the conduit and the light transparent envelope as the solar heat collector thermally cycles.

10. A solar power system comprising:
a plurality of solar troughs, at least one of the solar troughs comprising:
a solar heat collecting element comprising:
a conduit for carrying a heat transfer fluid, the conduit having first and second ends;
a light transparent envelope disposed about the conduit, the light transparent envelope having first and second ends;
an edge welded metal bellows assembly comprising:
a first annular end member comprising:
a first annular surface that engages a concave internal surface of an annular extension that extends from the light transparent envelope; and
a second annular surface that extends substantially perpendicularly from the first annular surface and limits insertion of the first annular end member into the annular extension;
a plurality of convolutions disposed entirely outside the light transparent envelope, the plurality of convolutions shaped to allow adjacent convolutions to nest against one another without permanent deformation; and
a light concentrator for directing solar radiation onto the solar heat collecting element.

11. The solar power system of claim 10, wherein the light concentrator comprises a parabolic mirror.

12. The solar power system of claim 10, wherein the edge welded metal bellows assembly is in a compressed state at room temperature, the edge welded metal bellows assembly expanding and contracting to accommodate the changing lengths of the conduit and the light transparent envelope as the solar heat collector thermally cycles.

13. The solar power system of claim 10, wherein the conduit is made of stainless steel or carbon steel.

14. The solar power system of claim 10, wherein the light transparent envelope is made of glass.

15. The solar power system of claim 10, wherein the edge welded metal bellows assembly is made of stainless steel.

16. The solar power system of claim 10, wherein the edge welded metal bellows assembly includes a second annular end member fixedly attached to the conduit.

17. The solar power system of claim 10, further comprising another edge welded metal bellows assembly coupling the second end of the conduit with the second end of the light transparent envelope.

18. The solar power system of claim 10, wherein the plurality of convolutions are shaped in such a manner so as to allow adjacent ones of the convolutions to nest against one another when the edge welded metal bellows assembly is in a compressed state, the edge welded metal bellows assembly expanding and contracting to accommodate changing lengths of the conduit and the light transparent envelope as the solar heat collector thermally cycles.

19. An edge welded metal bellows assembly comprising:
a first annular end member comprising a first annular surface and a second annular surface, the second annular surface extending substantially perpendicularly to the first annular surface, the first annular surface configured to engage a concave internal surface of an annular extension that extends from a glass envelope and defines an interior volume, the second annular surface configured to limit insertion of the first annular surface into the interior volume, the first annular end member defining an opening having a first diameter;
a first annular convolution of a plurality of annular convolutions that are disposed entirely outside the glass envelope and shaped to allow adjacent convolutions to nest against one another without permanent deformation when the edge welded metal bellows assembly is in a compressed state, the plurality of annular convolutions defining an opening having a second diameter that is less than the first diameter; and
a last annular convolution of the plurality of annular convolutions fixed to a second annular end member that is configured to be sealed with respect to a solar absorber, the second annular end member defining an opening having a third diameter that is less than the second diameter.

* * * * *